United States Patent [19]
Zeigler et al.

[11] Patent Number: 5,901,780
[45] Date of Patent: May 11, 1999

[54] AUXILIARY ACTIVE HEATING AND AIR CONDITIONING SYSTEM FOR MOTOR VEHICLE APPLICATIONS

[75] Inventors: Terry A. Zeigler, Byron, Ill.; Larry L. Peiffer, Whitewater, Wis.; William G. Guo, Davis Junction, Ill.; Uwe Rockenfeller, Boulder City, Nev.; Paul Sarkasian, Boulder City, Nev.; Lance D. Kirol, Boulder City, Nev.

[73] Assignee: Rocky Research, Boulder City, Nev.

[21] Appl. No.: 09/057,389

[22] Filed: Apr. 8, 1998

Related U.S. Application Data

[63] Continuation of application No. 08/667,936, Jun. 24, 1996, abandoned.

[51] Int. Cl.[6] .................................................. F25B 29/00
[52] U.S. Cl. ................................ 165/42; 165/62; 62/106; 62/244; 62/323.2; 62/480; 123/142.5 R; 237/12.3 B
[58] Field of Search .................................. 62/480, 323.2, 62/106, 244; 165/62, 42, 43; 123/142.5 R; 237/12.3 B

[56] References Cited

U.S. PATENT DOCUMENTS

| | | | |
|---|---|---|---|
| 3,057,171 | 10/1962 | Hulse et al. | 62/244 |
| 3,807,490 | 4/1974 | Engel | 165/42 |
| 4,249,491 | 2/1981 | Stein | 165/42 |
| 4,694,659 | 9/1987 | Shelton | 62/480 |
| 4,756,359 | 7/1988 | Greer | 165/43 |
| 4,765,395 | 8/1988 | Paeye et al. | 62/480 |
| 4,944,159 | 7/1990 | Crozat | 62/480 |
| 5,048,299 | 9/1991 | Retallirk | 62/244 |
| 5,222,375 | 6/1993 | Conrad et al. | 62/480 |
| 5,295,358 | 3/1994 | Rockenfeller et al. | 62/480 |
| 5,333,471 | 8/1994 | Yamada | 62/239 |
| 5,333,678 | 8/1994 | Mellum et al. | 165/42 |
| 5,335,719 | 8/1994 | Khelifa et al. | 62/239 |
| 5,526,648 | 6/1996 | Wertenbach et al. | 62/480 |
| 5,598,721 | 2/1997 | Rockenfeller et al. | 62/480 |

*Primary Examiner*—John K. Ford
*Attorney, Agent, or Firm*—Knobbe, Martens, Olson & Bear, LLP

[57] ABSTRACT

An auxiliary active heating and air conditioning system which uses a fuel fired heater as an energy source for both heating and air conditioning a passenger area of a motor vehicle. The system also utilizes a single heat exchanger to supply both heated and cooled air to the passenger area. The system includes a fuel fired heater for heating heat transfer fluid and a two bed sorber cooling system. The system being operable in a heating mode and a cooling mode. In the heating mode, the heated heat transfer fluid from the fuel fired heater is directed to heat exchanger in order to heat the passenger compartment. In the cooling mode, the heat transfer fluid from the heater is alternately directed to the two sorber beds such that one sorber bed is heated while the other bed cools. The alternate heating and cooling of the sorber beds in the cooling mode causes the sorber cooling system to operate and thereby deliver cooled heat transfer fluid to the heat exchanger in the passenger area.

20 Claims, 6 Drawing Sheets

AUXILIARY ACTIVE HEATING AND AIR CONDITIONING SYSTEM FOR MOTOR VEHICLE APPLICATIONS

This application is a continuation of Ser. No. 08/667,936, filed Jun. 24, 1996, now abandoned.

FIELD OF THE INVENTION

This invention generally relates to heating and air conditioning systems, and more particularly, to an auxiliary heating and air conditioning system for a motor vehicle which is configured such that it can operate continuously when the vehicle is not running.

BACKGROUND OF THE INVENTION

Large over the road vehicles such as tractor-trailer trucks frequently are used to transport cargo over great distances. During these long runs the drivers of these vehicles take periodic rest breaks and often sleep in the vehicle. In order to accommodate this, the passenger compartment of a tractor-trailer vehicle is typically divided such that it has a bunk or sleeper area just behind the cab of the truck. This sleeper area can be separated from the cab by a divider such as a curtain.

Generally, the vehicle also includes some sort of heating, ventilation, and air conditioning system that maintains the temperature in the sleeper area at a comfortable level while the driver is sleeping. Presently, there are several different types of heating and air conditioning systems that can be used for this purpose. One way to maintain the appropriate temperature in the sleeper area, simply is to use the heating and air conditioning system of the vehicle. This can be done either by leaving the truck running in idle while the driver sleeps or by "superheating" or "supercooling" the sleep area prior to shutting off the truck engine. However, both of these approaches have significant drawbacks. For example, running the truck in idle while the driver sleeps generates both air and noise pollution, requires a significant amount of fuel, and unnecessarily wears the engine parts. Likewise, superheating or supercooling of the sleeper area is only effective for a short period of time or when the temperature of the outside air is mild.

Another method for heating and cooling the sleeper compartment is to use a heating and air conditioning system which is auxiliary in nature in that it is capable of operating when the engine of the truck is shut off. For example, proposals have been made for heating and air conditioning the sleeper compartment which involve what will be termed "passive" auxiliary systems in that they use thermal storage media to store thermal energy during normal operation of the truck and then deliver that thermal energy in the form of heating or air conditioning when the engine of the truck is shut down. While these systems use some of the same components which are utilized in the present system, the components are used in a different manner, in that the passive nature of the system requires that sufficient energy be stored during normal operation of the truck to provide heating and air conditioning when the engine is shut down. Thus, these types of systems can only heat or cool the passenger compartment for a limited period of time. In particular, in order to heat or cool the sleeper area for a prolonged period of time, the thermal storage media must be charged by the operation of the truck for a prolonged period. More significantly, the thermal storage media must be capable of storing a large amount of thermal energy. Therefore, using this type of system to heat or cool a sleeper area for a prolonged period would likely impose cost, weight, and space requirements that are unacceptable.

In contrast to passive systems, heating and air conditioning systems which are "active" are those systems which are connected to their own independent power source and do not rely on any sort of thermal storage media. Thus, these systems have a relatively unlimited supply of energy to drive the heating air conditioning system for as long as needed. Active heating and air conditioning systems are well known in stationary installations. Typically stationary installations utilize furnaces for heating and compressor driven air conditioners for air conditioning. Some systems use common elements for both heating and air conditioning such as the heat pump. In general, however, these systems are stationary, and have fixed connections, particularly in the case of conventional air conditioners which must have connections to fixed electrical power sources in order to provide the relatively large amounts of power needed to drive the system.

As a result of the need for a sufficient power source, using active heating and air conditioning systems as auxiliary systems for motor vehicles present a different array of problems from passive systems. In particular, in a motor vehicle there is no massive electrical generating capacity which is capable of driving a conventional air conditioner when the engine is shut down nor is there a fixed heat sink such as is required by a heat pump. Fuel fired heaters have been capable of solving this problem for auxiliary heating systems, but insofar as applicant are aware, no active auxiliary refrigeration system has been available for dealing with the air conditioning problem. In order to drive a conventional rotary compressor driven auxiliary air conditioning system which is capable of producing the approximately 2,000 BTU/hr of cooling energy necessary for air conditioning a typical passenger compartment, a fairly large energy source must be incorporated into the motor vehicle.

Sorption cooling systems are also known, and it is known that they use the adsorption/desorption process to drive refrigerant around a refrigerant loop thus eliminating the need for a high powered rotary compressor. Insofar as applicants are aware, sorption cooling has certain niche applications, typically in fixed installations for specialized air conditioning and refrigeration requirements. Sorption air conditioning systems are generally driven by some type of heater. In smaller systems it is generally preferable to use an electric resistance heater. However, as the sorption system gets larger, the electric heater has to draw more power to operate the system. As a result expensive wires, switches, and controls which are capable of handling large currents must be provided. Thus, in larger sorption systems, steam heat from a boiler is generally used to drive the system.

OBJECTS AND SUMMARY OF THE INVENTION

Accordingly, in view of the foregoing it is a general object of the present invention to provide an auxiliary heating and air conditioning system for the passenger area of a motor vehicle in which the system is active, uses a heater operating from a readily available fuel source on board the motor vehicle to provide the energy for generating both heating and cooling, and avoids the need for rotary compressors.

Another object of the present invention is to provide an auxiliary heating and air conditioning system for use in motor vehicles which is highly reliable and uses common components for providing the energy which the system converts to heating or cooling.

An additional object of the present invention is to provide an auxiliary heating and air conditioning system for use in motor vehicles which imposes minimal space and weight requirements.

A related object of the present invention is to provide an auxiliary heating and air conditioning system for use in motor vehicles which has a modular design in which the majority of the components of the heating and air conditioning system, including the device for powering the system, can be located outside of the passenger area of the motor vehicle such that the operation of the system will produce minimal noise in the passenger area and the system can be easily installed, repaired and replaced.

Another object of the present invention is to provide an auxiliary heating and air conditioning system for use in motor vehicles which only minimally interferes with the normal operation of the motor vehicle.

A further object of the present invention is to provide an auxiliary heating and air conditioning system which is independently powered by an auxiliary power source that can utilize the same fuel source as the engine of the motor vehicle.

In practicing the invention, there is provided an auxiliary heating and air conditioning system capable of heating and cooling a passenger area of a motor vehicle for long periods of time. Desirably, in addition to the controls, the only element which need be introduced into the passenger compartment is a single heat exchanger. Heat transfer fluid is piped to the heat exchanger by external heating and air conditioning components, which include a single fuel fired heater operating from a fuel source on board the motor vehicle for providing the energy to drive the system. The fuel fired heater preferably, although not necessarily, operates on the same type of fuel as does the motor vehicle. Valve means directs heat transfer fluid heated by the fuel fired heater to the other system components to control both heating and air conditioning. In the cooling, the conditioned heat transfer fluid heated by the fuel fired heater is passed directly to the heat exchanger. In the air conditioning mode, the heater also heats fluid, but in this case, it is passed to a sorption air conditioning system.

The sorption cooling system in the present embodiment is preferably a two-bed system, in which each bed is configured to meet the cooling requirements of the passenger area for a predetermined interval. The two-bed system is operated in a duty cycle mode where one bed is heated for desorption, while the other is cooled for adsorption. The roles of the beds are switched at the predetermined interval. The heater is specially configured to have sufficient thermal capacity to drive the sorption cooling system. In particular, it must be capable of heating the heat transfer fluid to an adequate temperature to cause desorption/adsorption process in the beds, and it must have sufficient thermal capacity (BTU's per hour) to complete the desorption/adsorption process before the end of the predetermined interval.

In the cooling mode, the valve means directs heated heat-transfer fluid alternatively to the two sorber beds for driving the adsorption/desorption process alternatively in the two beds. As a result, the sorption cooling system drives refrigerant around a refrigerant loop, without the need for a rotary compressor. The refrigeration loop includes an evaporator which is piped to deliver cooled heat transfer fluid to the heat exchanger in the cooling mode.

The result is a combined system In which a minimum of components are added to the passenger area, most notably only a heat exchanger, and in which a single fuel fired heater operates in substantially the same way to drive both the heating and air conditioning operations. In a preferred embodiment, the components which are mounted outside the passenger area can be installed in a readily mountable module, and which then needs to be piped only to the heat exchanger in the passenger area and to a fuel source for the fuel fired heater.

These and other features and advantages of the invention will be more readily apparent upon reading the following description of a preferred exemplified embodiment of the invention and upon reference to the accompanying drawings wherein:

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENT

Figure 1:
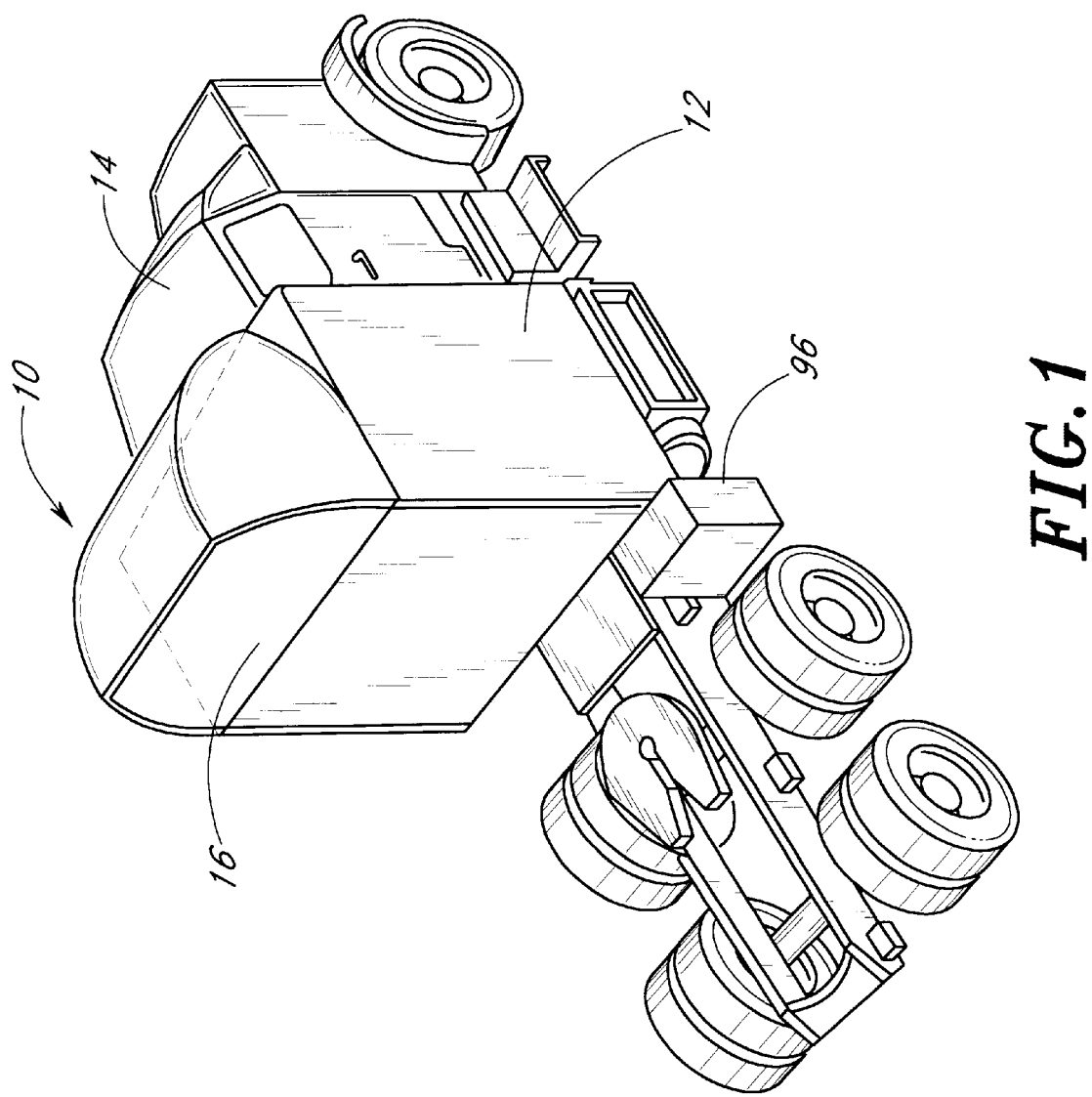
FIG. 1 is a view of a tractor of a tractor-trailer vehicle having a passenger area partitioned into cab and bunk areas and illustrating an important application of the present invention.

Referring now to the drawings, FIG. 1 shows a tractor 10 of a tractor-trailer vehicle. The tractor portion 10 of the tractor trailer vehicle includes an interior space that defines a passenger compartment 12 which includes a cab area 14 and a bunk or sleeper area 16. The bunk or sleeper area can be used by the driver of the vehicle 10 for periodic rest breaks during long runs. During operation of the vehicle 10, the passenger compartment 12 is generally heated and cooled by a primary heating and air conditioning system that is powered by the engine (not shown) of the tractor 10. More specifically, in heating, the hot engine coolant is piped to a heat exchanger in the passenger compartment. In cooling the engine drives a rotary compressor which compresses and drives refrigerant around a conventional air conditioning circuit which has an evaporator coil in the passenger compartment. However is during the driver's rest breaks, it is desirable to be able to shut down the engine of the tractor 10 in order to save fuel, reduce engine wear, and limit environmental pollution. Thus, the present invention is directed to a heating and air conditioning system that is auxiliary and active in nature in that it has an independent power source which is capable of continuously supplying heating and air conditioning to the passenger compartment 12 of the tractor-trailer vehicle 10 for prolonged periods, even while the engine is shut-down. While the present invention is described in connection with the passenger compartment of a tractor-trailer vehicle, the teachings of the present invention can be applied to the passenger compartment of any type of motor vehicle. In this respect the term motor vehicle is meant to encompass most types of mobile craft including tractor-trailer vehicles, cars, trucks, campers, certain boats, and small airplanes. Moreover, while the present invention is described in connection with the passenger compartment of a tractor trailer the teachings of the present invention could be applied to any area of a motor vehicle where passengers may be located. Thus, the term passenger area is meant to encompass all the areas of a motor vehicle where the passengers may be located including, for example, the passenger compartment of a tractor trailer vehicle, just the sleeper area of the passenger compartment of a tractor trailer vehicle, the living area of a camper, and the living and sleeping quarters of certain boats.

The present system is configured such that other than the controls for the system, a single heat exchanger which transmits both the heating and the cooling is the only component which must be introduced into the passenger compartment 12. In addition, the heating and air conditioning system of the present invention advantageously uses the same device, in this case a fuel fired heater, to provide the power for both heating and air conditioning. The fuel fired heater operates independently from the engine enabling the system to operate for a prolonged period and to not interfere with the operation of the engine. For heating, heat transfer fluid heated by the fuel fired heater is passed directly to the heat exchanger. For air conditioning, the fuel fired heater operates in exactly the same manner, however, the heated heat transfer fluid is passed to a sorption cooling system. In a preferred embodiment, the components of the system which do not need to be mounted in the passenger compartment, including the fuel fired heater and the sorption cooling system, can be installed a module which can be easily mounted outside of the passenger compartment and connected to the heat exchanger in the passenger compartment and to a fuel source for the fuel fired heater. Thus, the present invention provides an auxiliary system which can provide heating and air conditioning for long periods of time with little or no impact on the engine of the motor vehicle or on the passenger compartment. Moreover, the system utilizes very reliable components which can provide more than adequate heating and air conditioning to the passenger compartment motor vehicle while still allowing the system to remain relatively compact and easy to repair.

Figure 2:
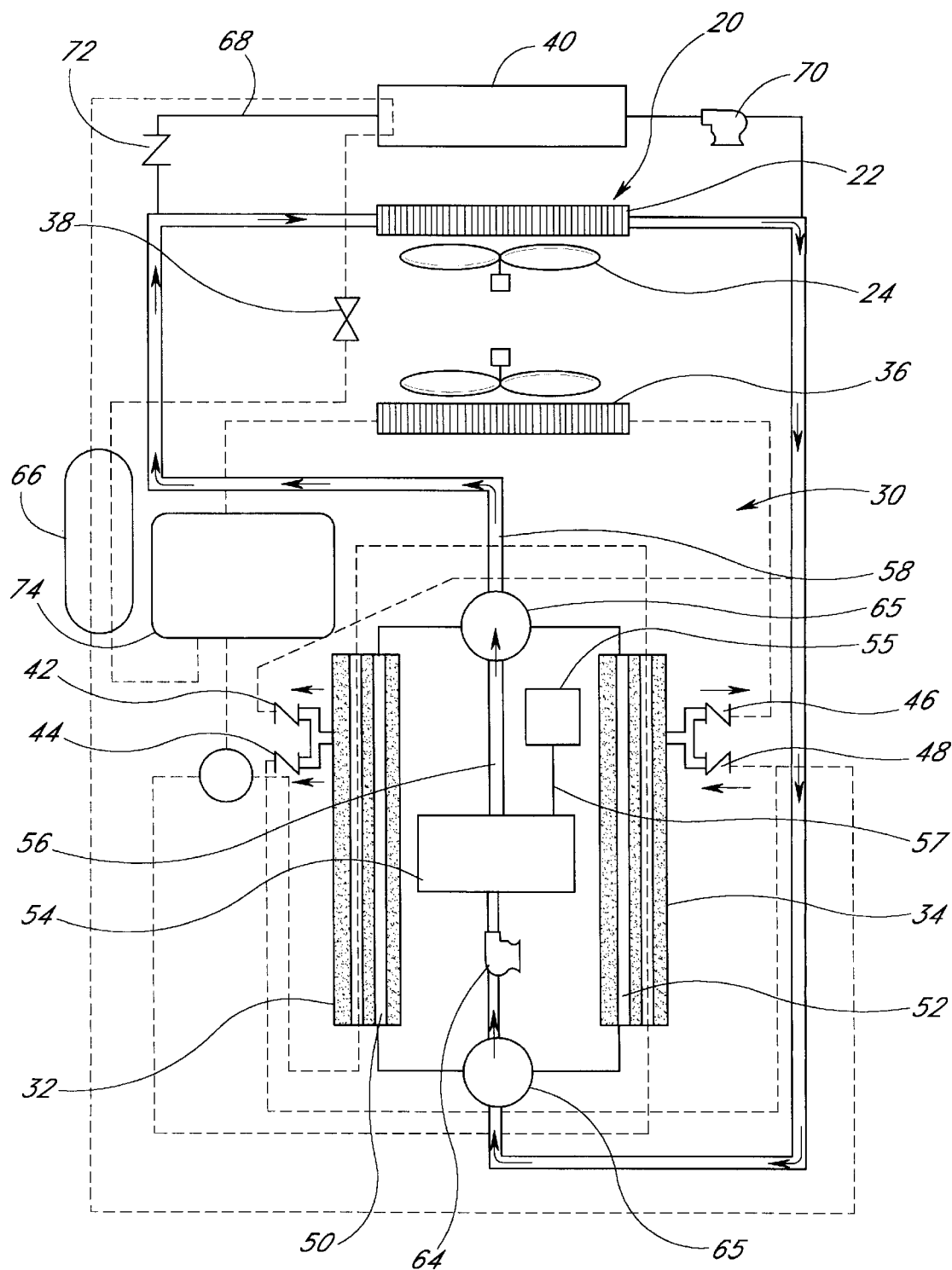
FIG. 2 is a schematic diagram of the auxiliary active heating and air conditioning system of the present invention showing the system operating to provide to heating.
Figure 3:
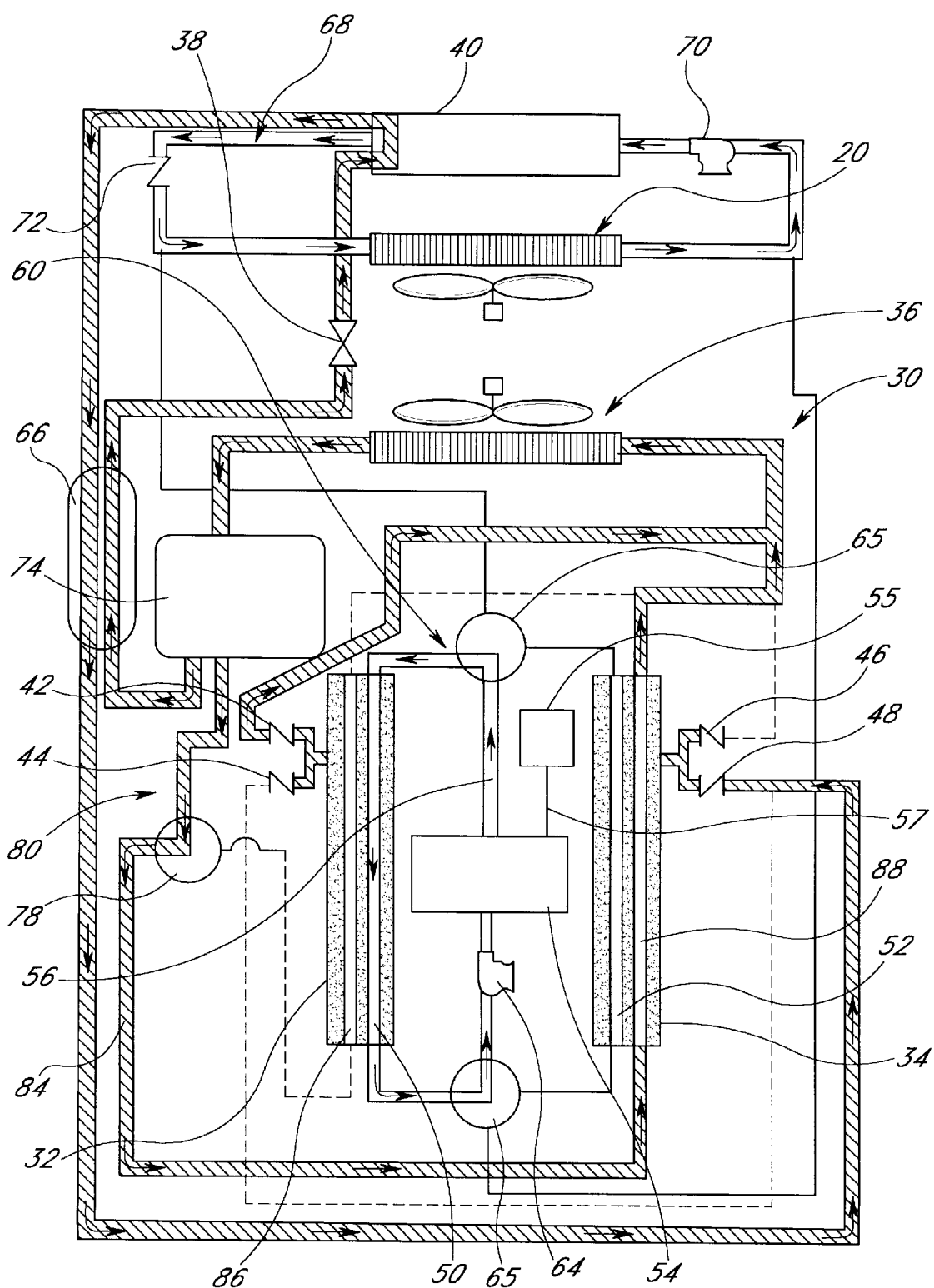
FIG. 3 is a schematic diagram of the auxiliary active heating and air conditioning system of the present invention showing the system operating to provide air conditioning with the left sorber desorbing.
Figure 4:
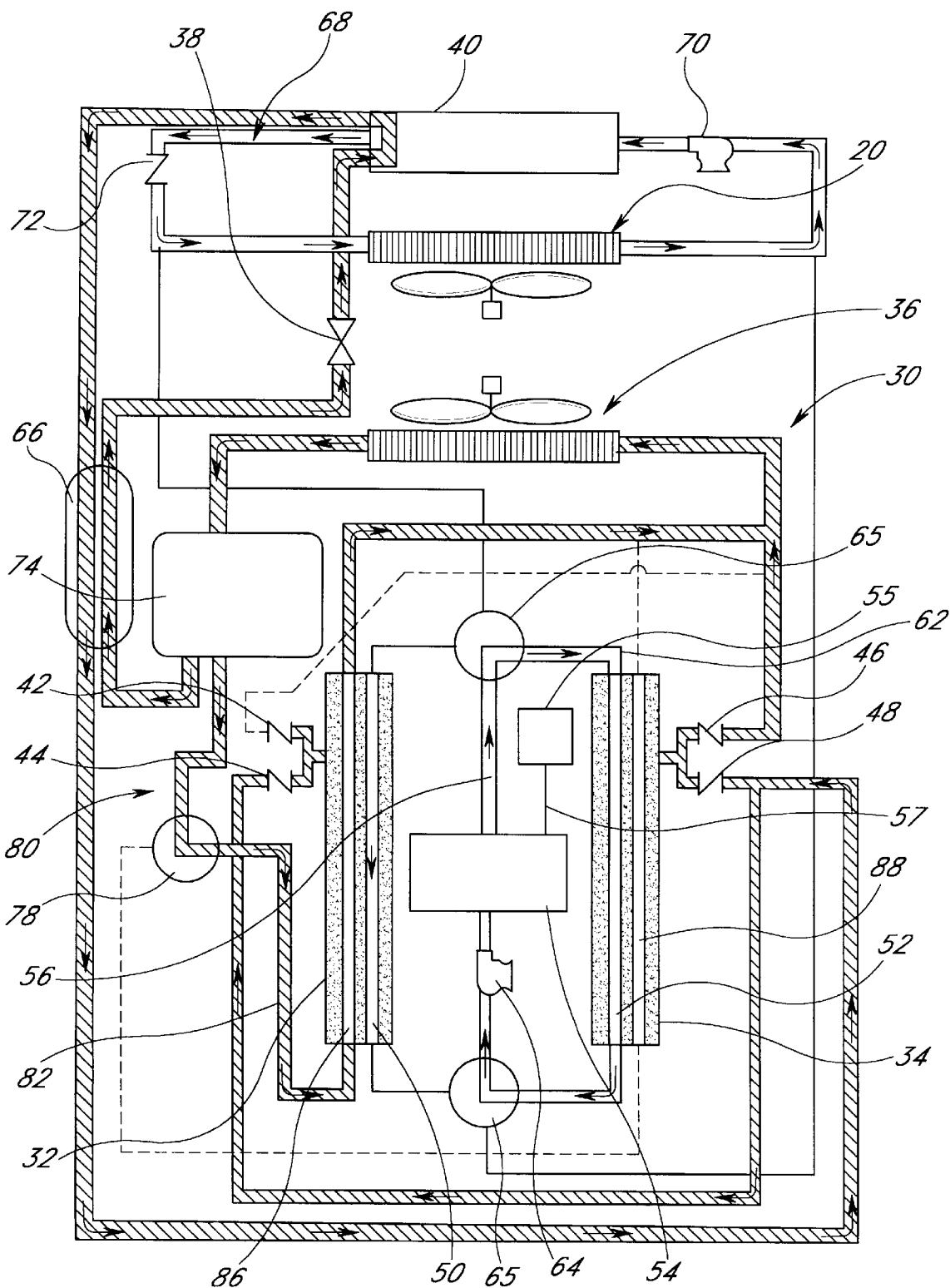
FIG. 4 is a schematic diagram of the auxiliary active heating and air conditioning system of the present invention showing the system in operating to provide air conditioning with the right sorber desorbing.

Referring now to FIGS. 2–4, a heating and air conditioning system constructed according to the present invention is schematically illustrated. The illustrated heating and air conditioning system is capable of operating in a plurality of modes and is adapted to selectively supply heated or cooled air to the passenger compartment 12 of the tractor 10 via a single heat exchanger 20 in the passenger compartment 12. The illustrated heat exchanger 20 includes a coil 22 having a passage through which heat transfer fluid can circulate. The heat transfer fluid that circulates through the coil 22 has been "conditioned" by the auxiliary heating and air conditioning system such that it is either heated heat transfer fluid or cooled heat transfer fluid. The thermal energy of the conditioned heat transfer fluid may be transferred from the coil 22 to the passenger or sleeper areas 12, 16 through convection by a blower 24 which directs air flow across the coil 22. Thus, unlike conventional heating and air conditioning systems for motor vehicles which typically have separate heating and air conditioning heat exchangers in a common air plenum and utilize dampers to direct air over one or the other or a mix of both, the present system only requires a single heat exchanger for both heating and air conditioning thereby reducing the weight, space, and cost requirements of the present system.

In order to power the heating and air conditioning of the passenger compartment, the auxiliary heating and air conditioning system includes a power source that operates independently of the engine of the tractor-trailer vehicle. In the preferred embodiment, the power source comprises a fuel fired heater 54 that has a passage 56 through which heat transfer fluid can be circulated and heated. The fuel fired heater 54 operates from a fuel source 55 which is located on board the tractor-trailer vehicle 10 and is connected to the heater by a fuel line 57. For both heating and air conditioning, the fuel fired heater 54 drives the system by providing heated heat transfer fluid, with heating being produced by directing this heated heat transfer fluid directly to the heat exchanger 20 and air conditioning being produced by directing the heat transfer fluid to a sorption cooling system.

As shown in FIGS. 2–4, the present system utilizes a two bed sorber cooling system. A two bed sorber cooling system is operated by alternately heating one of the sorber beds while the other bed cools. The bed being heated desorbs refrigerant from a refrigerant loop while the cooling bed adsorbs refrigerant from the loop thereby causing refrigerant to be driven around the loop. The roles of the two beds are switched at a predetermined interval in order to allow the sorber cooling system to continuously supply air conditioning. Although the foregoing has been provided as background information, it is understood that one of ordinary skill in the art will appreciate the implementation and operation of sorption systems to facilitate the practice of the present invention. In addition, while the sorber system of the present invention will be described as having two beds, those skilled in the art will appreciate that two bed sorber systems can include 4, 6, or more sorber beds so long as a first group of sorber beds and a second group of sorber beds are alternately heated and cooled.

Referring again to FIGS. 2–4, the illustrated sorber air conditioning system has a closed refrigerant loop 30 that includes first and second sorber beds 32, 34, a condenser 36, a flow device such as an expansion valve 38, and an evaporator 40. The refrigerant loop also includes check valves 42, 44, 46, 48 which facilitate the flow of refrigerant through the loop 30 during the desorption and adsorption of the sorber beds 32, 34. The first and second sorber beds 32, 34 each include an independent passage 50, 52, respectively, through which heat transfer fluid can circulate in order to heat the bed for desorption. Each of the sorber beds 32, 34 contain a solid sorbent material which can bond and release large quantities of a refrigerant such as ammonia. Preferably, the solid sorbent material comprises an organic salt or an ammoniate or hydrate of metal. The first and second sorber beds 32, 34 each have sufficient capacity to meet the air conditioning requirements of the passenger compartment 12 for the interval that is desired between the temperature shifting of the beds.

The fuel fired heater 54 is specially configured to have sufficient thermal capacity to power the auxiliary heating and air conditioning system during both the summer and winter. More particularly, during the summer, the fuel fired heater 54 must be capable of heating the heat transfer fluid to an adequate temperature to cause the desorption/adsorption process in the beds, and it must have sufficient thermal capacity to complete the desportion/adsorption process before the end of the predetermined interval. Moreover, the fuel fired heater 54 must have sufficient capacity to meet the heating requirements of the passenger compartment 12 during the winter. For example, with a typical sleeper area in a passenger compartment, an auxiliary heating and air conditioning system should be able to produce at least 2000 BTU/hr of cooling energy during the summer and more than 4000 BTU/hr of heating energy during the winter. For such a system, if ammonia is used as the refrigerant, metal inorganic salts are used as the sorbent material, and conventional vehicle engine coolant is the heat transfer fluid a fuel fired heater capable of heating the heat transfer fluid to 270° F. and producing a minimum of 7500 BTU/hr should be provided. Such a system would produce 2000 BTU/hr of cooling air at a temperature of 55° F. in the summer and 7500 BTU/hr of heating air at a temperature of 150° F. in the winter. Such a system would have a volume of approximately 4.5 cubic feet and a weight of approximately 150 lbs.

The use of a fuel fired heater for the power source is particularly advantageous because it is a packaged device long used in the heating and automotive industries and therefore is readily available and highly reliable. A fuel fired heater has also proven to be particularly suited for motor vehicle applications since a fuel source is already available. Accordingly, a fuel fired heater should be selected which can utilize the same fuel source as the engine of the motor vehicle. For example, with tractor-trailer vehicles that run on diesel fuel it is preferable to use a diesel fuel fired heater. Similarly, with vehicles that run on gasoline it is preferable to use a gasoline fired heater. However, those skilled in the art will appreciate that fuel fired heaters that do not utilize the same fuel source as the vehicle can also be used. For example, a propane fired heater could be utilized merely by mounting a propane tank to the exterior of the vehicle and providing a fuel line interconnecting the tank with the heater.

Referring again to FIGS. 2–4, the system also includes a heat transfer fluid circulatory system that selectively interconnects the heat transfer fluid passage 56 in the heater 54 with either the heat transfer fluid passage in the first sorber bed 32, the second sorber bed 34, or the heat exchanger 30. The heat transfer fluid circulatory system includes at least three independent heat transfer fluid paths. A first path 58 that circulates heat transfer fluid between the heater 54 and the heat exchanger 20 (best shown in FIG. 2), a second path 60 that circulates heat transfer fluid between the heater 54 and the first sorber bed 32 (best shown in FIG. 3), and a third path 62 that circulates heat transfer fluid between the heater 54 and the second sorber bed 34 (best shown in FIG. 4). As shown in FIGS. 2–4, in order to facilitate the circulation of the heat transfer fluid, the system includes a pump 64 which is positioned such that it can drive the heat transfer fluid through any of the three paths. It will be appreciated that any type of heat transfer fluid could be used in the heat transfer fluid circulatory system including water or a mixture of water and antifreeze.

In accordance with an important aspect of the invention, the present system includes valve means 65 for directing the heated heat transfer fluid 54 which is produced by the heater 54 such that the heater can be used to power both the heating and the air conditioning. The valve means 65 is operable in at least a heating mode and cooling mode. In the heating mode, heat transfer fluid heated by the fuel fired heater 54 is directed as conditioned heat transfer fluid to the heat exchanger. In the cooling mode, heat transfer fluid heated by the fuel fired heater 54 is alternately directed at the predetermined interval to the respective sorber beds for causing refrigerant adsorption and desorption. In the illustrated embodiment, the valve means 65 comprises a multi-directional valve located adjacent the outlet of the fuel fired heater which receives heated heat transfer fluid and directs it to either the first, second, or third heat transfer fluid paths 58, 60, 62. The illustrated valve means 65 also includes a second multi-directional valve adjacent the inlet to the fuel fired heater 54 which, while not necessarily controlling the direction of the flow of the heat transfer fluid from the heater 54, interrupts the backflow of heat transfer fluid into the sorber beds 32, 34 during heating, and into the heat exchanger 20 and the adsorbing sorber bed during air conditioning.

The operation of the auxiliary heating and air conditioning system of the present invention when the system is being used to provide heating and air conditioning will now be described in greater detail. In the schematic drawings of the auxiliary heating and air conditioning system, the active portions of the heat transfer fluid circulatory system (i.e. those containing circulating fluid) are depicted as double solid lines with arrows indicating the direction of the flow while the inactive portions are drawn as solid single lines. Similarly, the active portions of the refrigerant circulatory system are drawn as thick cross hatched lines with arrows indicating the direction of flow while the inactive portions are drawn as dashed lines.

During heating, the heated heat transfer fluid from the heat transfer fluid passage 56 of the fuel fired heater 54 is directed to the heat exchanger 20 in the passenger compartment 12 via the valve means 65. More specifically, as shown schematically in FIG. 2, during the heating mode, heat transfer fluid circulates through the first fluid path 58 such that heated heat transfer fluid from the output of the fuel fired heater 54 circulates through the heat exchanger 20 in the passenger compartment. In the heat exchanger 20, the thermal energy of the heated heat transfer fluid is transferred to the passenger compartment via the blower 24. During the heating mode, the refrigerant in the refrigerant loop 30 is not circulating and the second and third heat transfer fluid paths 60, 62 which circulate heat transfer fluid from the heater 54 through the first and second sorber beds 32, 34 respectively are interrupted or shut off.

During air conditioning, the first heat transfer fluid path 58 which circulates heated heat transfer fluid through the heat exchanger 20 is interrupted and the heated heat transfer fluid from the heater 54 is alternately circulated via the valve means 65 through the first and second sorber beds 32, 34 in order to heat one sorber while the other sorber bed cools. FIG. 3 schematically illustrates the heat transfer fluid flow and the refrigerant flow during the half cycle where the first sorber 32 is being heated and the second sorber 34 is cooling. Similarly, FIG. 4 schematically illustrates the heat transfer fluid flow and the refrigerant flow during the half cycle where the second sorber 34 is being heated and the first sorber 32 is cooling. The time for each half-cycle is equal to the interval that is chosen for temperature shifting the two beds.

Referring now to FIG. 3, the valve means 65 is directing heat transfer fluid to circulate in the second heat transfer fluid path 60 that interconnects the fuel fired heater 54 and the first sorber bed 32 while the heat transfer fluid paths 58, 62 are interrupted or shut off. During the half cycle of the cooling mode that is illustrated in FIG. 3, check valves 42 and 48 are open and check valves 44 and 46 are closed. As the heated heat transfer fluid is circulated through the heat transfer fluid passage 50 in the first sorber 32 bed via the pump 64 the thermal energy in the fluid is transferred to the sorbent material in the bed. As the sorbent material is heated, the sorbent material therein begins to desorb refrigerant vapor to the refrigerant loop 30. While the first sorber bed 32 is being heated for desorption of refrigerant, the second sorber 34 bed cools from an elevated temperature. As the second sorber bed 34 cools, the sorbent material therein continuously adsorbs refrigerant vapor from the refrigerant loop 30. The combined action of the first sorber bed 32 desorbing or "pushing" refrigerant into the refrigerant loop 30 and the second sorber bed 34 adsorbing or "pulling" refrigerant from the refrigerant loop 30 drives the refrigerant around the refrigerant loop 30 without the need for a mechanical compressor.

As shown in FIG. 3, the refrigerant vapor that is desorbed by the first sorber bed 32 is first condensed into liquid form in the condenser 36 and then vaporized back into vapor form in the evaporator 40. Finally, the refrigerant vapor is adsorbed by the second sorber bed 34. A flow device such as an expansion valve 38 is disposed between the condenser 36 and the evaporator 40 to lower the pressure of the liquid refrigerant which enters the evaporator 40 in order to change the saturation point of the refrigerant. The evaporator 40 is piped by path 68 to deliver cooled heat transfer fluid to the heat exchanger 20 during the air conditioning mode. As is known, refrigerant evaporators absorb heat in the chemical transformation of the refrigerant from the liquid to the vapor state. Therefore, the cooling energy that is generated by the circulation of the refrigerant through the evaporator 40 during the cooling mode is used to cool the heat transfer fluid circulating in the path 68 connecting the evaporator 40 and the heat exchanger 20. The path 68 includes a pump 70 which drives the heat transfer fluid through the path. In addition, the path 68 includes a check valve 72 which is disposed to interrupt or shut off the path 68 during the heating mode.

In order to further improve the performance of the sorber cooling system, the system includes a subcooler 66 disposed in the refrigerant loop such that it lowers the temperature of the refrigerant before it enters and after it exits the evaporator. In addition the sorber cooling system includes a refrigerant reservoir 74 for storing any extra refrigerant that is needed for the operation of the system.

The adsorption of refrigerant from the refrigerant loop 30 by the adsorbing sorber bed produces heat. In order to improve the performance of the system, the system includes a secondary refrigerant loop which recirculates a portion of the refrigerant from the refrigerant loop through the cooling sorber bed in order to remove this heat. More specifically, as shown in FIGS. 4, the sorber cooling system is provided with a recirculation control valve 78 downstream in the refrigerant loop from the condenser 36 which controls the recirculation of refrigerant through a secondary refrigerant loop 80 that includes both sorber beds. As shown in FIG. 3, during the cooling mode cycle where the first sorber bed is being heated, a portion of the refrigerant circulating in the refrigerant loop is diverted to the secondary refrigerant loop 80 via the control valve 78 and through line 88 to the second sorber bed 34. In order to allow for the passage of the recirculated refrigerant, each of the sorber beds 32, 34 can be equipped with passages 86, 88 for the circulation of refrigerant. The recirculated refrigerant that flows via line 84 and through passage 88 in the second sorber bed 34 absorbs heat from the sorbent material in the second bed, thereby ensuring that the sorber bed cools properly, and thus adsorbs refrigerant more efficiently. Other methods for removing heat from the adsorbing sorber bed could also be used, including removing heat via convection by forcing air flow across the sorber bed.

After the half-cycle illustrated in FIG. 3 has run for the predetermined interval, the next half-cycle of the cooling mode is then initiated by temperature shifting the two beds. This is accomplished by directing the flow of heated heat transfer fluid from the heater 54 via the valve means 65 through the third heat transfer fluid path 62 which interconnects the heater 54 and the second sorber bed 34, as shown in FIG. 4. The temperature shifting of the beds reverses the roles of the first and second sorber beds 32, 34. Thus, as the second sorber bed 34 heats it desorbs refrigerant vapor into the refrigerant loop 30 and as the first sorber bed 32 cools it adsorbs refrigerant vapor from the refrigerant loop 30. During this half-cycle check valves 44 and 46 are open and check valves 42 and 48 are closed. As with the half-cycle illustrated in FIG. 3, heat transfer fluid is circulated between the evaporator 40 and the heat exchanger 20 via the secondary heat transfer fluid path 68 in order to enable the heat exchanger 20 to supply cool air to the passenger compartment 12 of the vehicle. In addition, as with the half cycle illustrated in FIG. 3 and described above, a portion of the refrigerant in the primary refrigerant loop 30 can be recirculated through the refrigerant passage 86 in the first sorber bed 34 by directing refrigerant through line 82 via the control valve 78.

The unique characteristics of the two bed sorber system described above enable the refrigerant to be circulated in the refrigerant loop 30 without the need for any compressors or mechanical pumps. More specifically, the refrigerant can be kept circulating continuously in the refrigerant loop 30, merely by running the fuel fired heater 54 and temperature shifting the two beds at the predetermined interval. The elimination of the need for compressors or mechanical pumps enables the system to operate on less power and substantially reduces the number of moving parts in the system which could be subject to possible failure. In addition, since both the heating and the air conditioning are powered by a fuel fired heater that is independent of the engine of the tractor-trailer vehicle, the system can operate continuously even if the vehicle has not been run for a prolonged period since the fuel fired heater 54 is driven by a fuel source, such as the diesel fuel tank of the tractor-trailer, instead of by energy that is stored from the operation of the vehicle.

Figure 5:
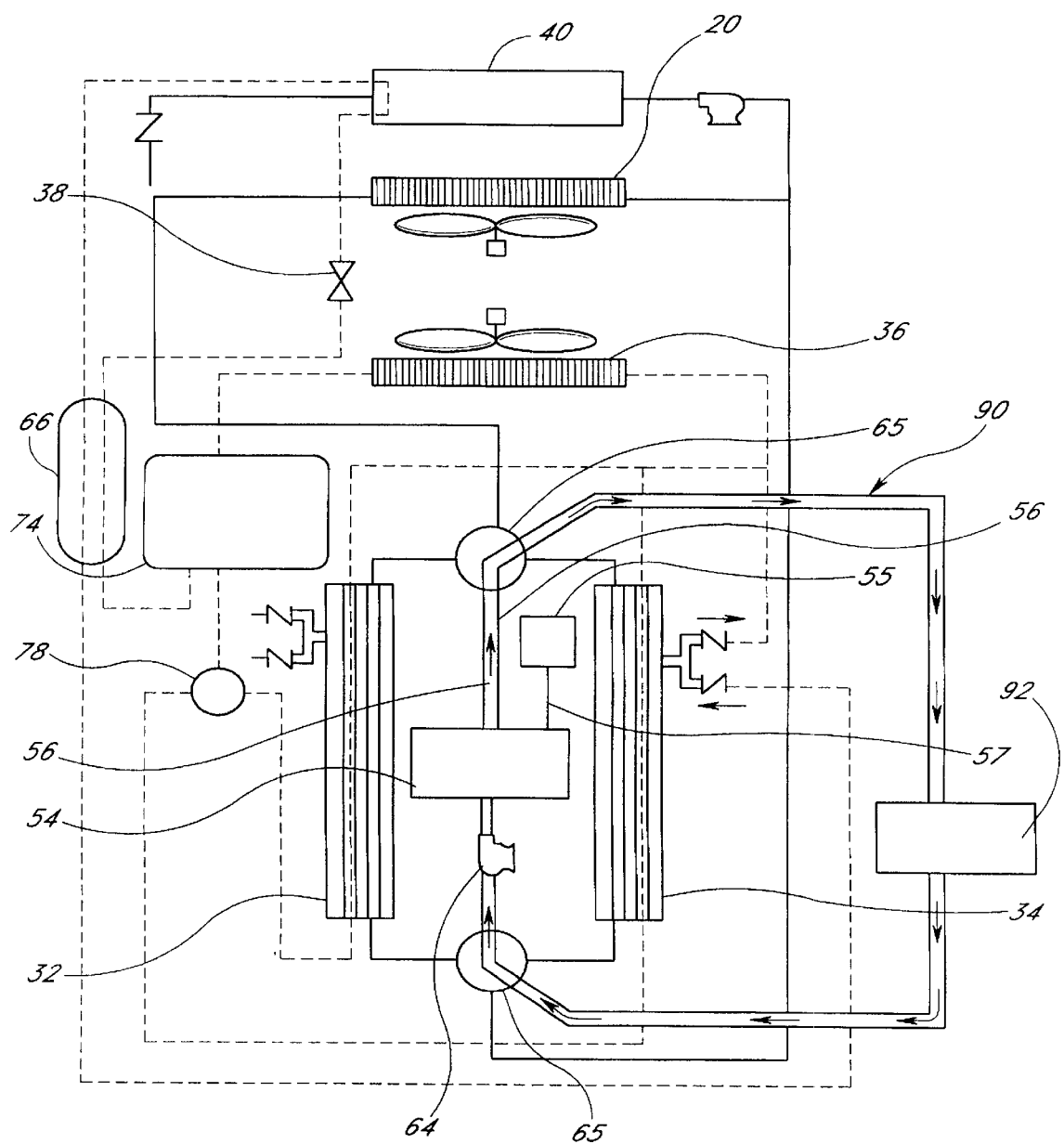
FIG. 5 is a schematic diagram of the auxiliary active heating and air conditioning system of the present invention operating to preheat the engine.

In a further embodiment of the present invention, the auxiliary heating and air conditioning system can be used to preheat the engine of the motor vehicle. As schematically illustrated in FIG. 5, the valve means 65 includes an engine preheat mode wherein the heated heat transfer fluid from the heater 54 is directed through a fourth path 90 in the heat transfer fluid circulatory system which interconnects the fuel fired heater 54 with the coolant system 92 of the engine of the vehicle.

Figure 6:
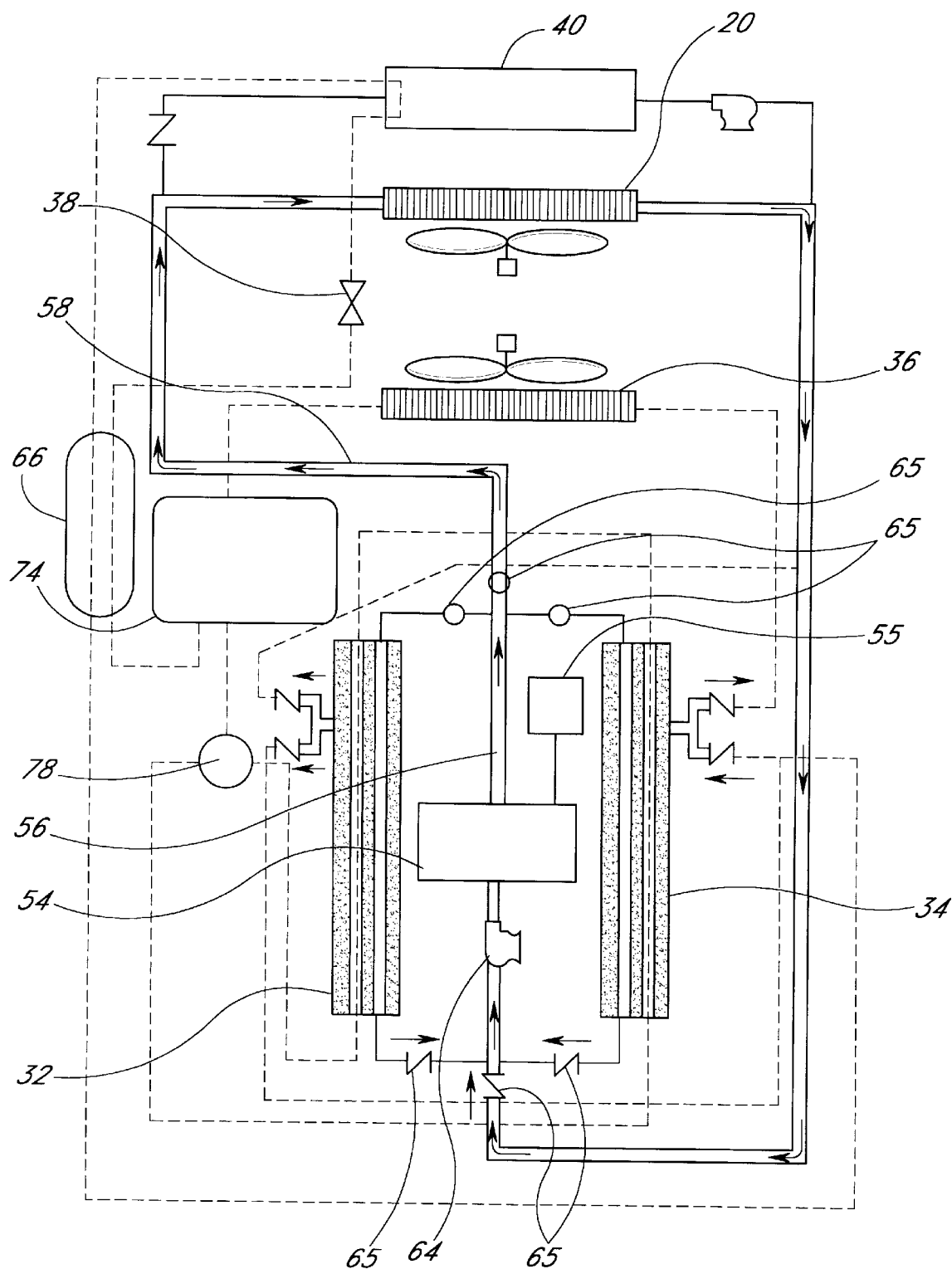
FIG. 6 is a schematic diagram of the auxiliary active heating and air conditioning mode of the present invention showing an alternative embodiment of the valve means in the heating mode.

As can be understood from the foregoing, those skilled in the art will appreciate that the valve means 65 is not limited to the illustrated multi-directional valves at the inlet and the outlet of the fuel fired heater 54. For example, the valve means 65 could comprise at least three separate control valves with at least one valve being located in each of the three fluid paths 58, 60, 62 such that they could direct the flow of the heated heat transfer fluid from the heater 54 into the appropriate paths as shown schematically in FIG. 6 (illustrating the heating mode). In addition, check valves could be provided in each of the heat transfer fluid paths adjacent the point they reenter the heater in order to interrupt the backflow of heat transfer fluid into the appropriate paths when they are not being used.

In order to facilitate the installation, repair, and replacement of the system, the heating and air conditioning system of the present invention can have a modular design. With the modular design, the sorber cooling system and the fuel fired heater 54 are located in an auxiliary heating and air conditioning module 96 that is mounted on the exterior of the vehicle as shown in FIG. 1. The module 96 is interconnected with the heat exchanger 20 in the passenger compartment 12 via the primary and secondary heat transfer fluid circulatory systems. As shown in FIG. 1, the module 96 can be substantially in the form of a rectangular enclosure which can be easily mounted to the frame of the tractor-trailer vehicle 10 just behind the sleeper area 16 of the cab. If the system is designed with the characteristics given in the example described above, the system can be contained in a module that is no larger than 5 cubic feet. In addition to the position shown in FIG. 1, the module 96 could also be located just behind the sleeper area 16 on the opposite side of the frame or it could be mounted to the exterior of the rear wall of the passenger compartment 12.

Since the heating and air conditioning system is located primarily outside of the passenger compartment 12 of the vehicle, the system can be accessed for repairs quite easily without having to enter the vehicle or open the engine compartment. The modular design and the exterior location also make it easier to retrofit existing trucks with the system since space does not have to be made within the passenger or engine compartments. Similarly, the modular design of the system makes the system easy to replace with another system when the system must be repaired. Moreover, as opposed to auxiliary heating and air conditioning systems that have significant components connected to the engine, connected to the primary air conditioning system, or located in the engine compartment, the exterior location of the module 96 avoids the possibility of any interference with the normal operation of the vehicle.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and the scope of the invention as defined by the following claims.

What is claimed is:

1. An auxiliary active heating and air conditioning system using a fuel fired heater for both heating and air conditioning a passenger area of a motor vehicle and comprising:

a heat exchanger in the passenger area piped to receive conditioned heat transfer fluid;

a sorber cooling system located outside the passenger area and having two sorber beds, each of sufficient capacity to meet the cooling requirements of the passenger compartment for a predetermined interval, and being piped to be alternately operated at duty cycle corresponding to the predetermined interval where one bed is adsorbing and the other bed is desorbing to drive refrigerant around a refrigerant loop, the refrigerant loop including an evaporator piped to deliver conditioned heat transfer fluid to the heat exchanger during air conditioning;

a fuel fired heater outside the passenger area and of sufficient thermal capacity to desorb a single sorber bed during the predetermined interval, and valve means for directing heat transfer fluid heated by the fuel fired heater and having a plurality of modes including:

a heating mode wherein heat transfer fluid heated by the fuel fired heater is directed as conditioned heat transfer fluid to the heat exchanger, and a cooling mode wherein heat transfer fluid heated by the fuel fired heater is alternately directed at the predetermined interval to the respective sorber beds for causing refrigerant adsorption and desorption.

2. The auxiliary active heating and air conditioning system of claim 1 wherein the motor vehicle has an engine cooling system piped to receive heat transfer fluid and the control means further includes an engine preheating mode wherein the heat transfer fluid from the fuel fired heater is directed to the motor vehicle engine cooling system.

3. The auxiliary active heating and air conditioning system of claim 1 wherein the sorber cooling system and the fuel fired heater are disposed in an auxiliary heating and air conditioning module that is mounted to the exterior of the motor vehicle.

4. The auxiliary active heating and air conditioning system of claim 1 wherein the heater is fired by diesel fuel and the fuel source is a diesel fuel tank that also supplies fuel to the engine of the motor vehicle.

5. The auxiliary active heating and air conditioning system of claim 1 wherein the heater is propane fired and the fuel source is a propane tank.

6. The auxiliary active heating and air conditioning system of claim 1 wherein the heater is gasoline fired and the fuel source is a gasoline tank that also supplies fuel to the engine of the motor vehicle.

7. The auxiliary active heating and air conditioning system of claim 1 wherein the first and second sorber beds each are piped to receive refrigerant and the refrigerant loop includes a secondary refrigerant path that circulates refrigerant through the adsorbing sorber bed in order to remove heat therefrom.

8. The auxiliary active heating and air conditioning system of claim 1 wherein the fuel-fired heater and the sorber beds are sized to provide to the passenger compartment with at least 2000 Btu/hr of air conditioning energy and more than 4000 Btu/hr of heating energy.

9. The auxiliary active heating and air conditioning system of claim 8 wherein the refrigerant is ammonia, the sorbent material is a metal inorganic salt, the heat transfer fluid is engine coolant and the heater has sufficient thermal capacity to heat the heat transfer fluid to approximately 270° F. and produce 7500 BTU/hr of heating energy.

10. The auxiliary active heating and air conditioning system of claim 9 wherein the fuel fired heater and the sorber cooling system including the two sorber beds are disposed in an enclosure mounted to the frame of the motor vehicle that is no larger than 5 cubic feet.

11. The auxiliary active heating and air conditioning system of claim 1 wherein the valve means includes a single controllable multi-directional valve for directing the heat transfer fluid heated by the fuel fired heater.

12. The auxiliary active heating and air conditioning system of claim 11 wherein the valve means further includes a valve which interrupts the backflow of heat transfer fluid into the sorber beds in the heating mode and into the heat exchanger and the adsorbing sorber bed in the cooling mode.

13. An auxiliary active heating and air conditioning system using a fuel fired heater for both heating and air conditioning a passenger area of a motor vehicle and comprising:

a heat exchanger in the passenger area including a passage for circulating heat transfer fluid, a sorber cooling system located in an auxiliary heating and air conditioning module mounted to the exterior of the motor vehicle and having a refrigerant loop including an evaporator piped to deliver heat transfer fluid to the heat exchanger during air conditioning and two sorber beds, each of sufficient capacity to meet the cooling requirements of the passenger area for a predetermined interval and each having a passage for the circulation of heat transfer fluid, a fuel fired heater located in the auxiliary heating and air conditioning module and of sufficient capacity to desorb a single sorber bed during the predetermined interval, a heat transfer fluid circulatory system which selectively circulates heated heat transfer fluid from the fuel fired heater to either the heat exchanger, the first sorber bed, or the second sorber bed, valve means in the heat transfer fluid circulatory system for directing the heated heat transfer fluid from the fuel fired heater, the valve means being controllable between a plurality of modes including:

a heating mode wherein the heat transfer fluid from the fuel fired heater is circulated through the heat exchanger, and a cooling mode wherein the heat transfer fluid from the fuel fired heater is alternately circulated at the predetermined interval to heat transfer fluid passages of the two sorber beds in order to heat one sorber bed for desorption while the other bed cools for adsorption thereby driving refrigerant in the refrigerant loop.

14. The auxiliary active heating and air conditioning system of claim 13 wherein the motor vehicle has an engine cooling system that is interconnected with the heat transfer fluid circulatory system and the valve means further includes an engine preheating mode wherein the heat transfer fluid from the fuel fired heater is directed to the motor vehicle engine cooling system.

15. The auxiliary active heating and air conditioning system of claim 13 wherein the piping between the evaporator and the heat exchanger includes a check valve that interrupts the fluid flow in the piping during the heating mode.

16. The auxiliary active heating and air conditioning system of claim 13 wherein the two sorber beds each include a passage for the circulation of refrigerant and the refrigerant loop includes a secondary refrigerant path that circulates refrigerant through the refrigerant passage in the adsorbing sorber bed in order to remove heat therefrom.

17. A method of selectively heating or air conditioning a passenger area of a motor vehicle, the motor vehicle having an engine and fuel source located on board the motor vehicle, the method comprising the steps of:

providing an heating and air conditioning module on the vehicle external of the passenger area containing a two bed sorber cooling system and having a passenger compartment heat exchanger piped to receive conditioned heat transfer fluid from the module, circulating heat transfer fluid from the module to the heat exchanger for selectively heating or air conditioning the compartment, operating a fuel fired heater from the on-board fuel source whenever heating or air conditioning is required, in heating directing heated heat transfer fluid from the fuel fired heater to the passenger compartment heat exchanger, in air conditioning, alternately directing heated heat transfer fluid from the fuel fired heater to operate the sorber beds and thereby the sorber cooling system for air conditioning the passenger area.

18. The method of claim 17 further including the step for preheating the engine, directing heated heat transfer fluid from the fuel fired heater to the engine.

19. The method of claim 17 further including the step of sizing each of the sorber beds to have sufficient capacity to meet the cooling requirements of the passenger area for a predetermined interval.

20. The method of claim 19 further including the step of sizing the fuel fired heater to have sufficient thermal capacity to desorb a single sorber bed during the predetermined interval.

\* \* \* \* \*